(No Model.)
C. F. SHAW.
ATTACHMENT FOR SADDLERS' STITCHING HORSES.
No. 416,865. Patented Dec. 10, 1889.
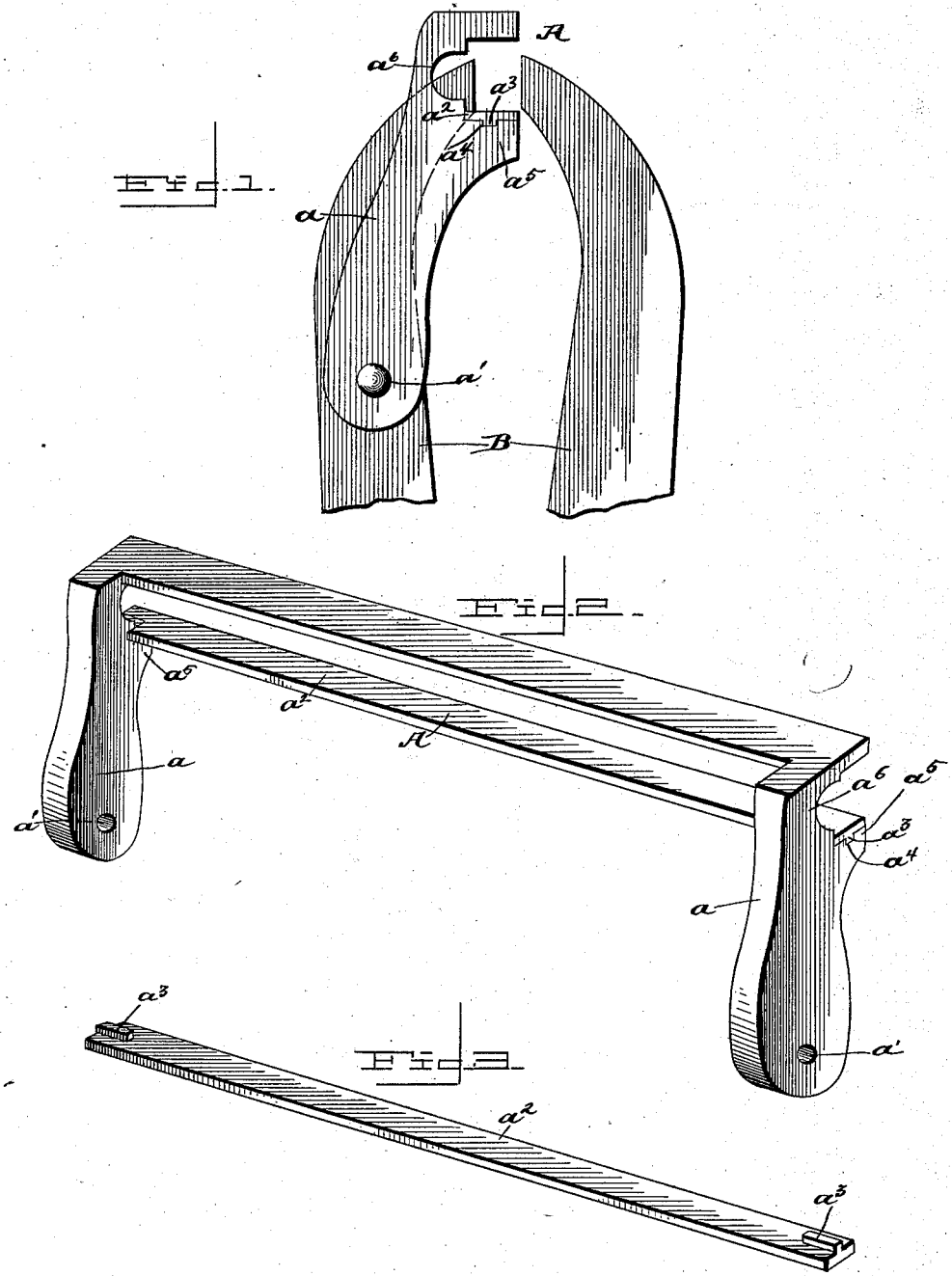
WITNESSES
Walter H. Pumphrey.
Paul W. Stevens
INVENTOR
Charles F. Shaw
By Myers &Co.
Attorneys.

UNITED STATES PATENT OFFICE.

CHARLES F. SHAW, OF TAMA, IOWA.

ATTACHMENT FOR SADDLERS' STITCHING-HORSES.

SPECIFICATION forming part of Letters Patent No. 416,865, dated December 10, 1889.

Application filed April 1, 1889. Serial No. 305,627. (No model.)

*To all whom it may concern:*

Be it known that I, CHARLES F. SHAW, a citizen of the United States of America, residing at Tama, in the county of Tama and State of Iowa, have invented certain new and useful Improvements in Attachments for Saddlers' Stitching-Horses, of which the following is a specification, reference being had therein to the accompanying drawings.

This invention relates to certain improvements in attachments for saddlers' stitching-horses, having especially for its object to hold a line, whether round or other shape in cross-section, while being sewed or stitched; and to this end the nature of the invention consists of a proximate trough-shaped contrivance having means for its connection with the horse, and a movable bottom bar, which may be replaced by another of different thickness, according to the thickness of the line or article to be stitched or sewed, as will more fully appear from the following description and accompanying illustrations, in which—

Figure 1 is an end elevation of a saddler's stitching-horse to which is applied my line-holder. Fig. 2 is a detached perspective view of the line-holder, and Fig. 3 is a similar view of the bottom or lower movable bar.

In the embodiment of my invention I employ a proximate trough-shaped contrivance or holder A for the line or article to be sewed. This holder or contrivance A has two end pieces or arms $a$ $a$ through apertures $a'$ $a'$, in the lower ends of which are passed pivots pivotally connecting them with the outer sides of one member or jaw of the horse B. The lower or bottom bar $a^2$ of the holder A is removable, having splines or projections $a^3$ $a^3$— one at each end—entering sockets $a^4$ $a^4$ in the upper edges of projections $a^5$ $a^5$, standing parallel with the upper or top bar of the holder. This bottom bar, consequently, can be replaced by another bar of different thickness, according to the thickness of the line or article to be held while being sewed.

In the outer side of both arms of the holder, just in rear of the recesses $a^5$, formed by the trough shape of the holder, is a cavity or notch $a^6$, to provide additional space for the reception and passage therethrough of the greater thickness of line produced by the lapping of the end of the line to permit the sewing or stitching operation to be begun at the extreme outer end of the line.

A line either in round or rectangular cross-section can be accommodated or held by means of this holder or contrivance.

Having thus fully described my invention, what I claim, and desire to secure by Letters Patent, is—

1. The line-holder attachment for saddlers' stitching-horses, having a proximate trough shape and provided with a removable bar, substantially as set forth.

2. The line-holding contrivance for saddlers' stitching-horses, having a removable bar provided with projections or splines entering sockets in projections of the arms of the holders, substantially as set forth.

3. The line-holder for saddlers' stitching-horses, having a proximate trough shape and a removable bar, and having both arms formed with straight horizontal walls and in rear thereof a semicircular notch or concavity, substantially as specified.

4. The line-holding contrivance for saddlers' stitching-horses, having the arms pivoted to the latter and of proximately trough shape, the same also having a movable bar provided with projections or splines entering sockets in the arms, both arms having in their outer sides a notch or cavity, substantially as specified.

In testimony whereof I affix my signature in presence of two witnesses.

CHARLES F. SHAW.

Witnesses:
BERT SMITH,
ALBERT KUCERA.